United States Patent [19]
Cantarutti

[11] 4,025,251
[45] May 24, 1977

[54] VULCANIZER LOCK MEANS

[75] Inventor: Armindo Cantarutti, Akron, Ohio

[73] Assignee: NRM Corporation, Akron, Ohio

[22] Filed: Nov. 6, 1975

[21] Appl. No.: 629,504

[52] U.S. Cl. .................................. 425/31; 425/38; 425/46; 425/47

[51] Int. Cl.² ........................................ B29H 5/08

[58] Field of Search ................ 425/31, 32, 33, 34, 425/39, 43, 46, 47, 40, 29, 17, 18, 19, 38

[56] References Cited

UNITED STATES PATENTS

| | | | |
|---|---|---|---|
| 1,566,259 | 12/1925 | Calvin | 425/47 |
| 1,908,282 | 5/1933 | Brown | 425/40 |
| 2,198,493 | 4/1940 | Freeman | 425/40 |
| 2,254,415 | 9/1941 | Boyd et al. | 425/43 X |
| 2,393,503 | 1/1946 | Bosomworth et al. | 425/47 |
| 2,997,738 | 8/1961 | Soderquist | 425/38 X |
| 3,137,032 | 6/1964 | MacMillan | 425/19 |
| 3,550,196 | 12/1970 | Gaguit | 425/38 X |
| 3,922,122 | 11/1975 | Bottasso et al. | 425/46 |
| 3,932,079 | 1/1976 | Legostaev et al. | 425/38 X |

FOREIGN PATENTS OR APPLICATIONS

| | | | |
|---|---|---|---|
| 191,280 | 8/1957 | Austria | 425/29 |

*Primary Examiner*—J. Howard Flint, Jr.
*Attorney, Agent, or Firm*—Donnelly, Maky, Renner & Otto

[57] ABSTRACT

Vulcanizer lock means for a vulcanizer of the type wherein a tire carcass is shaped and cured in a mold cavity defined between top and bottom mold sections which are respectively mounted on a vertically movable support member and a fixed support member characterized in the provision of a mold-embracing lock ring which at its lower end has a rotatable, but axially fixed, connection with said fixed support member and which at its upper end has radially inwardly extending lugs with bottom helical surfaces engaged with top helical surfaces of radially outwardly extending lugs of said movable support member when said lock ring is rotated to locking position, said lugs being circumferentially offset when said lock ring is rotated to unlocking position to permit vertical movement of said movable support member and top mold section for unloading of the cured tire and for loading of the next uncured carcass. The vulcanizer lock means is further characterized in that means for rotating the lock ring to locking position is effective merely to bring the helical lug surfaces into mating contact without preloading, the modulus of elasticity and cross section area of the lock ring being such that, upon application of vulcanizing pressure within the tire carcass in the mold cavity, the elastic elongation of the lock ring maintains mold separation within predetermined permissible flash limits. To minimize the force requirements for rotating the lock ring to and from locking position, it is rotatably supported by bearings on said fixed support member. Furthermore, the helix angle of the interengaged lug surfaces is less than the angle of friction so that mold separating force does not impose a torque load on the lock ring in unlocking direction.

28 Claims, 7 Drawing Figures

VULCANIZER LOCK MEANS

BACKGROUND OF THE INVENTION

Heretofore, it has been a prevalent practice in the vulcanizer art to utilize a toggle-like mechanism such as a bull gear crank and heavy structural members including a beam and base to resist high deflection and shear loads caused by the high curing pressre within the tire in the mold.

It has also been proposed to employ bayonet-type lock mechanisms wherein tremendous forces are applied to obtain the desired preloading and, of course, this involves high pressure sliding contacts with resulting imposition of high torque loads which must be resisted by strong and heavy constructions of the parts required for preloaded lock up of the mold sections in mold-closing position.

SUMMARY OF THE INVENTION

In contradistinction to know constructions, the vulcanizer lock means herein only requires a lock ring which surrounds the mold sections when in mold-closing position and which has a modulus of elasticity and cross section area in relation to the projected area of the tire carcass times the vulcanizing pressure such as to lock the mold sections in closed position while the elastic elongation of the lock ring permits mold separation within predetermined acceptable flash limits during the vulcanizing operation, said lock ring being actuated to and from locking position with a minimum torque load thereon which effects only bringing of the locking surfaces into mating engagement without preloading of the lock ring.

It is a principal object of this invention to provide a vulcanizer lock means of the character indicated in which the lower end portion of the lock ring and the bottom mold support member have radially overlapped annular surfaces and in which the upper portion of the lock ring and the top mold support member have radially overlapped helical surfaces, the mold when closed being locked in closed position by rotation of the lock ring to effect mating engagement of said radially overlapped annular surfaces and radially overlapped helical surfaces to resist separation of the top and bottom mold sections upon imposition of vulcanizing pressure within the tire carcass which is being cured and shaped in the closed mold, the modulus of elasticity and cross section area of the lock ring being such that under such vulcanizing pressure, it elongates only within permissible flash limits.

Another object is to provide a vulcanizer which does not require a heavy bull gear, beam and base for locking the mold sections together.

A further object is to provide a vulcanizer which requires a minimum of energy to close and lock.

A still further object is to provide a vulcanizer with a low floor loading and a minimum sub-structure for support the vulcanizer.

Other objects and advantages of the present invention will become apparent as the following description proceeds.

DETAILED DESCRIPTION OF A PREFERRED EMBODIMENT

Figure 1:
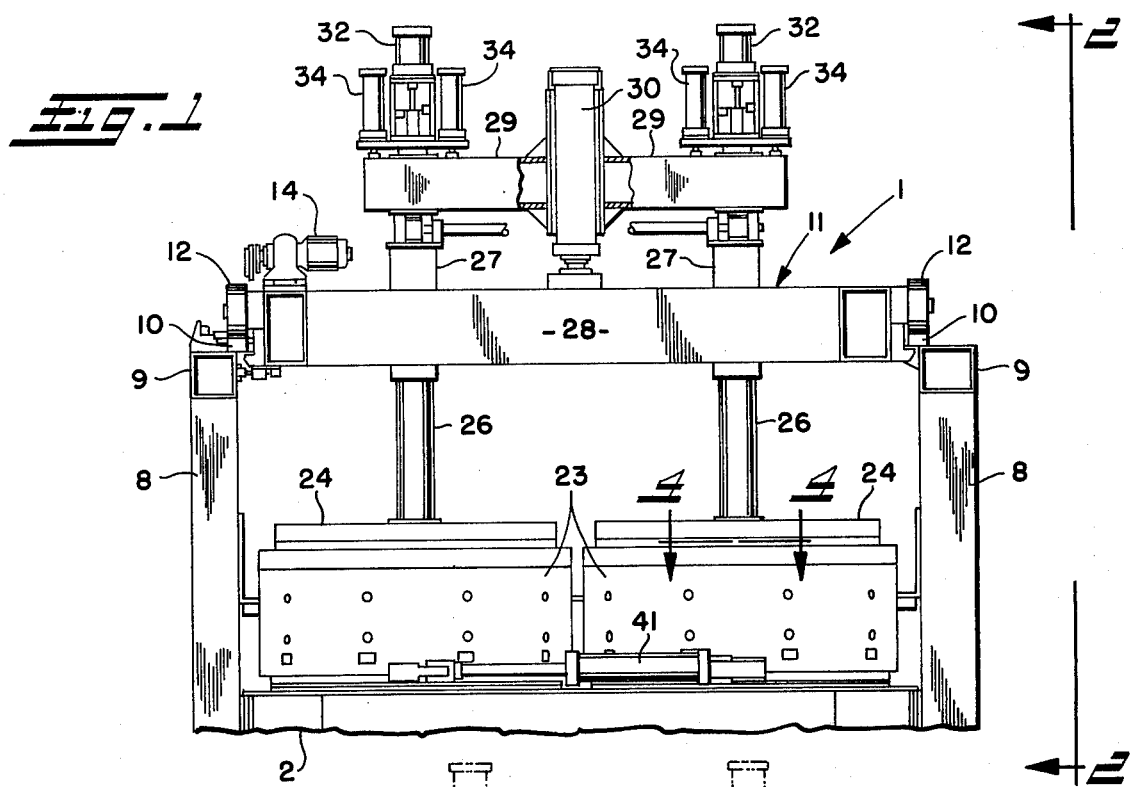
FIG. 1 is a front elevation view of a tire vulcanizer embodying the vulcanizer lock means constituting the present invention.

The vulcanizer or tire curing press 1 herein illustrated is of the dual cavity type but it will be understood that the principles of the present invention are equally applicable to a single cavity press.

The press 1 herein shown comprises a base structure 2 to which a pair of mold support plates or members 3 are secured each of which supports a bottom mold section 4 thereon with an intervening heating platen 5 through which heating fluid is circulated in well known manner. Within each bottom mold support plate 3 and bottom mold section 4 is disposed a bladder assembly 6 and actuating cylinders 7 for manipulating said bladder assembly 6 as hereinafter explained.

Figure 2:
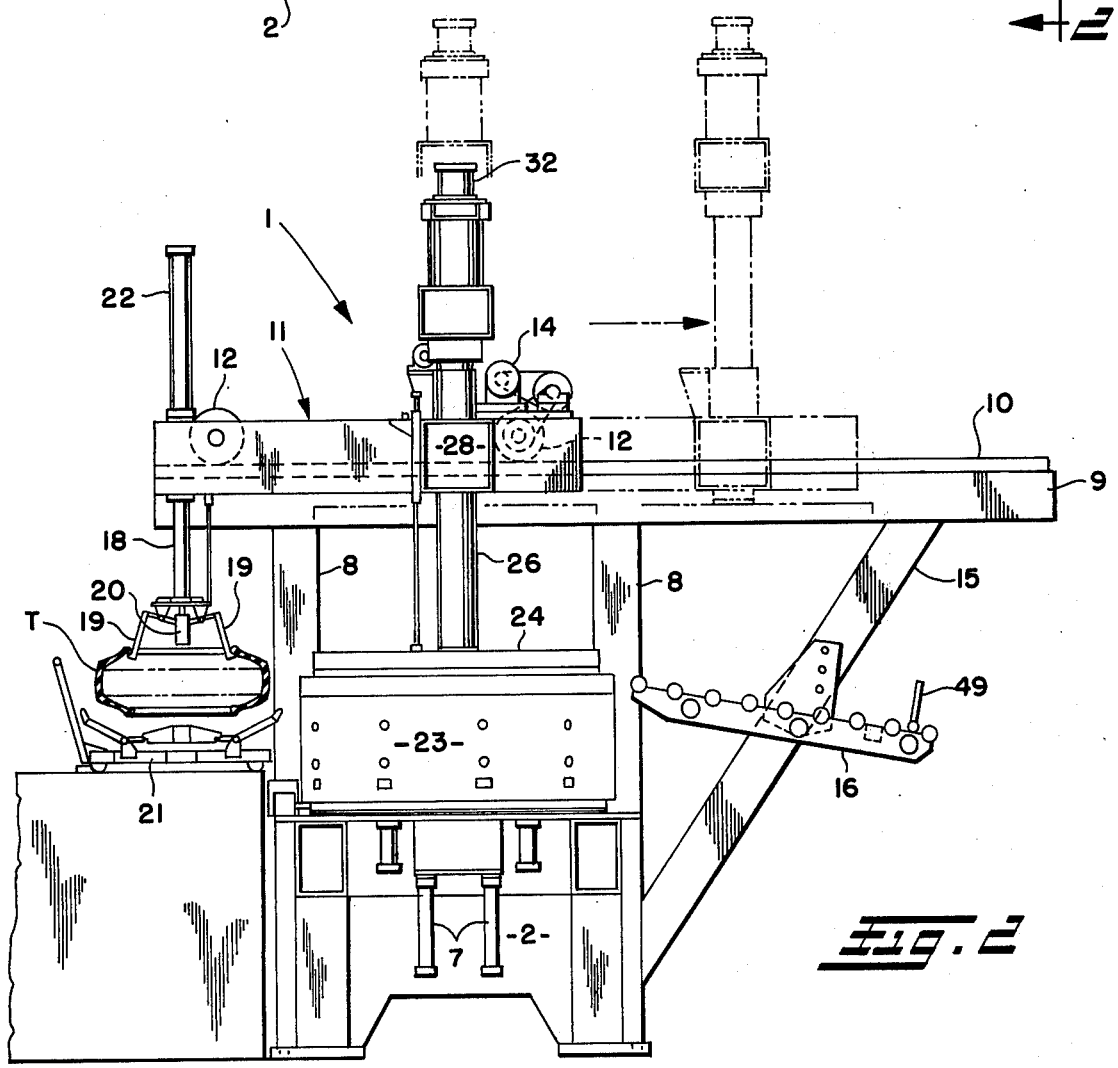
FIG. 2 is a side elevation view of the FIG. 1 vulcanizer as viewed along the line 2—2, FIG. 2.

At opposite ends of the base structure 2 are tubular columns 8 which support upper horizontal frame members 9 which have rails 10 for horizontal movement of a carriage 11 having pairs of rolls 12 engaged with said rails 10, one pair of rolls 12 being driven as by an electric motor drive 14. The rear ends of the frame members 9 are supported by diagonal frame members 15 which mount therebetween an inclined discharge conveyor 16 upon which cured tires T are adapted to be discharged when the top mold sections 17 are in raised position and when the carriage 11 is actuated to the rear phantom line position shown in FIG. 2.

Vertically reciprocably mounted on the carriage 11 at the front end thereof are a pair of carcass loader assemblies 18 which have radially outwardly movable fingers 19 actuated by cylinders 20 which are adapted to be engaged under the top beads of uncured tire carcasses T thus to lift the carcasses T from the carts 21 upon actuation of the cylinders 22 to a position above the lock rings 23 which constitute heat shields and which surround the respective top and bottom mold sections 17 and 4 when the latter are in mold closing position.

Also vertically reciprocably secured to the carriage 11 are a pair of top mold supporting plates or members 24 to which the respective top mold sections 17 are secured with intervening heating platens 25 through which heating fluid is adapted to be circulated. Each top mold support plate 24 has a central upwardly extending tubular rod 26 which is slidable in a sleeve 27 in the cross beam 28 of the carriage 11, the upper ends of said rods 26 being connected to the respective cross arms 29 of a piston cylinder assembly 30 secured to cross beam 28. Each rod 26 is hollow and has at its lower end an unloading mechannism 31 actuated as by the cylinder 31 operative in well known manner to enable stripping the cured tire T from the bottom mold section 4. Cylinders 34 are operative in well known manner to permit upward movement of the top mold sections 17 with respect to the mechanism 31 for stripping of the top mold section 17 from the cured tires T.

Figure 7:
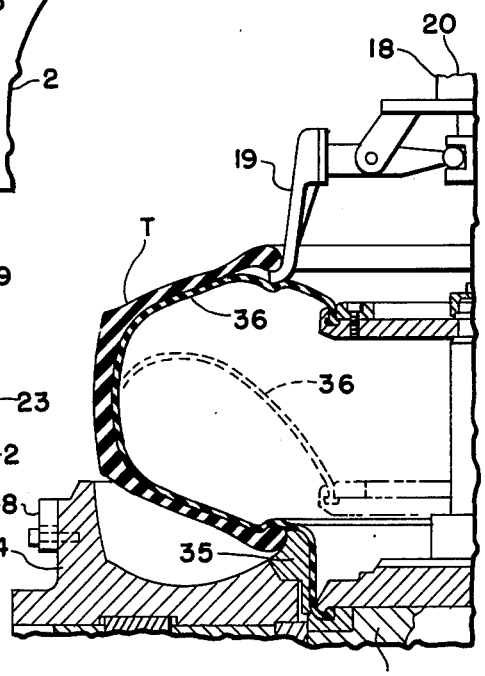
FIG. 7 is a radial cross section view showing a carcass loader for positioning an uncured tire carcass on the bottom mold section.

When the top mold sections 17 are in the elevated rear position, the loaders 18 are coaxially aligned above the bottom mold sections 4 whereby uncured tire carcasses T carried by said loaders 18 may be lowered to place the lower beads of the carcasses T around the bottom toe rings 35 whereby the bladder assemblies 6 may be actuated in well known manner to progressively insert the bladders 36 within the tire carcasses T whereupon the loader fingers 19 may be actuated radially inwardly to release the tire carcasses T in centered position on the bottom mold sections 17 as shown in FIG. 7. The loaders 18 are then actuated upwardly.

With the tire carcasses T thus loaded onto the bottom mold sections 4 and held by the bladders 36 therewithin, the carriage 11 may be shifted forwardly to position the respective top mold sections 17 in coaxial alignment above the bottom mold sections 4 whereupon the fluid motor 30 may be actuated to lower the top mold sections 17. At the same time (or thereafter) the loaders 18 may be moved downwardly with the fingers 19 in their radially inner positions to extend within the top beads of the next pair of tire carcasses T.

Figure 3:
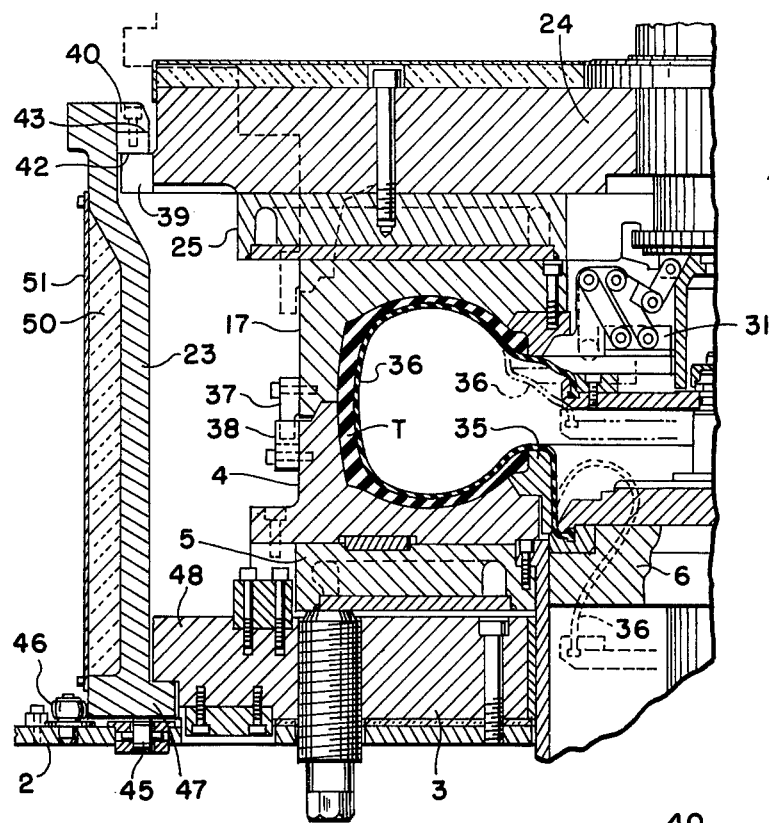
FIG. 3 is a radial cross section view on enlarged scale illustrating the vulcanizer in locked position to lock the mold sections together for shaping and curing a tire carcass disposed in the mold cavity defined by the mold sections.
Figure 6:
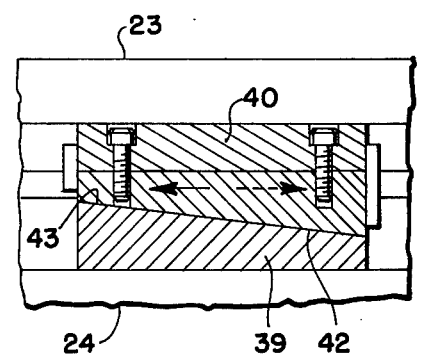
FIG. 6 is a cross section view taken substantially along the lines 6—6, FIG. 5 illustrating the mating engagement of the helical surfaces of the lugs of the lock ring and the top mold section support member.
Figure 4:
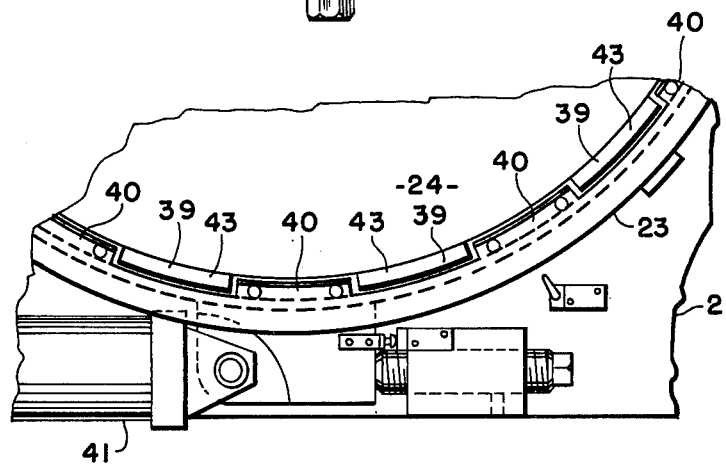
FIG. 4 is a fragmentary top plan view along line 4—4, FIG. 1 showing the vulcanizer lock means in unlocking position permitting vertical movement of the top mold section into and out of mating engagement with the bottom mold section.
Figure 5:
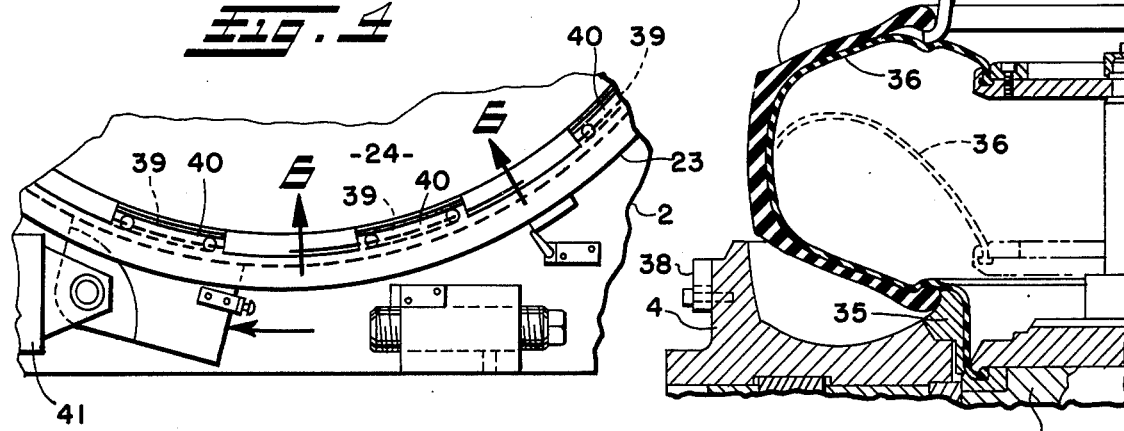
FIG. 5 is similar to FIG. 4 except illustrating the vulcanizer lock means in locking position to lock the mold sections together in vulcanizing position.

When the top and bottom mold sections 17 and 4 are in mating engagement as shown in FIG. 3, with the locaters 37–38 interengaged as shown, the radially outwardly extending lugs 39 of the support member 24 will have passed downwardly between the spaces between the radially inwardly extending lock ring lugs 40 as shown in FIG. 4. Each lock ring 23 constitutes a heat shield and in a dual cavity press, a single piston cylinder assembly 41 may be employed for rotating the lock rings 23 in opposite directions to effect interengagement of the helical surfaces 42 and 43 of the lock ring and top support member lugs 39 and 40. In the example herein, the lock ring 23 at the right as viewed in FIG. 1 is rotated in a clockwise direction as viewed in FIG. 4 to the locking position of FIG. 5 and hence the helical surfaces 42 and 43 are lefthand whereas the lock ring 23 at the left will be rotated in a counterclockwise direction to locking position and hence the helical surfaces 42 and 43 are righthand. The helix angle of the surfaces 42 and 43 of the lugs 39 and 40 is less than the angle of friction so that during vulcanization there is no torque tending to rotate the lock rings 23 toward unlocking position. In the case of steel lugs 39 and 40 the helix angle may be about 7°.

To decrease the forces for rotation of the lock rings 23 between locking and unlocking positions they are supported by rollers 45 and are held coaxially by rollers 46 around the periphery. The annular surfaces of the flanges 47 and 48 are in close proximity and the magnitude of the fluid pressure in the cylinder 41 is such as to only bring the flange 47 and 48 surfaces into metal to metal contact should there be a slight initial clearance thereat and to bring the helical surfaces 42 and 43 of the lugs 40 and 39 into mating contact without preloading of the lock rings 23. The cross section size and material of each lock ring is selected so that during the vulcanization process the projected area of the tire T times the vulcanizing pressure tending to separate the mold sections 17 and 4 causes an elastic elongation of each lock ring 23 within a few thousandths of an inch which is within permissible flash limits.

When the tire carcasses T have been cured in the mold cavities, the vulcanizing fluid pressure is released thus to relieve the pressures between the interengaged helical surfaces 42 and 43 and between the interengaged flange 47 and 48 surfaces whereby low pressure actuation of the cylinder 41 will effect rotation of the lock rings 23 to unlocked position wherein the lugs 39 of the support member 24 are disposed between the locking ring lugs 40 as shown in FIG. 4.

Upon release of the vulcanizing fluid pressure, the cylinders 32 may be actuated to press the top head of each bladder assembly 6 downwardly and to actuate the unloader 31 segments radially outwardly as shown in dot-dash lines in FIG. 3 whereupon the top mold section 17 may be moved vertically to strip the same from the upper half of the cured tire T.

As the top mold sections 17 move upwardly, the bladder assemblies 6 are actuated in well known manner to strip the bladders 36 from within the cured tires T as shown in dotted lines in FIG. 3 whereupon continued upward movement of the support members 24 will cause the unloader 31 segments to engage under the upper beads of the tires T to strip the tires T from the bottom mold sections 4 and to lift them upwardly above the lock rings 23. Thereupon, the carriage drive motor 14 is energized to shift the upper mold sections 17 rearwardly to the dot-dash line position shown in FIG. 2 at which position, the fluid motors 32 are actuated to withdraw the unloader 31 segments radially inwardly so that the cured tires T will drop down to the discharge conveyor 16 from which they roll off upon actuation of the stop fingers 49.

During the curing operation, the curing pressure acting on the projected area of each tire T and the projected area of each bladder head assembly will tend to lift the respective top mold section 17 and its support member 24 whereby an upward pressure is applied by the support member lugs 39 on the lock ring lugs 40 thus to impose a tensile load on each lock ring 23 but as aforesaid the modulus of elasticity of the material of the lock ring 23 and its cross section thickness is such that the elastic elongation is a minute amount within a few thousandths of an inch which is within permissible flash limits. For example, the elongation in a lock ring for a truck tire vulcanizer may be between .005 inch and .008 inch. Each lock ring 23 has insulating material 50 covered by a sheet metal ring 51 thus to constitute a heat shield and by reason of the provision of the upper frusto-conical portion, each lock ring 23 is strengthened against upward tipping of the lugs 40 by upward pressure applied by the lugs 39 of the top support member 24.

The present embodiment shown in the drawings and described above is for a platen type press; however, it is understood that the invention may be applied to a steam dome type press with substantially the same advantages.

The embodiment of the invention in which an exclusive property or privilege is claimed are defined as follows:

1. In a tire curing press comprising an annular fixed mold support plate, an annular vertically movable mold support plate movable to open and close the press, an axially elongated cylindrical rotatable ring journalled with respect to said fixed mold support plate and surrounding both said fixed and movable mold support plates when said press is closed, said ring including an inturned flange at one end interfitting with a flange on said fixed mold support plate, and a breech lock at the other end of said ring interfitting with said movable mold support plate to lock said press closed during cure when said movable mold support plate is closed and said ring is rotated.

2. A tire curing press as set forth in claim 1 wherein said fixed mold support plate is mounted on a base, said ring being journalled on said base for rotational movement with respect to said fixed mold support plate.

3. A tire curing press as set forth in claim 2 including anti-friction axial and radial thrust bearing means supporting said ring for rotation around said fixed mold support plate.

4. A tire curing press as set forth in claim 1 wherein said ring comprises the cylindrical heat shield of the press.

5. A tire curing press as set forth in claim 1 including means to preclude relative rotation between said movable mold support plate and said fixed mold support plate when said press is closed and during the rotation of said ring to lock and unlock said press.

6. A tire curing press as set forth in claim 1 including a piston-cylinder assembly operative to rotate said ring from an adjustable stop wherein said breech lock is open to a position wherein said breech lock is closed.

7. A tire curing press as set forth in claim 1 wherein said breech lock includes a series of circumferentially, equally spaced lugs on the ring and movable mold support plate, respectively, which may be offset or aligned by rotation of said ring, said lugs when circumferentially permitting vertical movement of said movable mold support plate to open said press.

8. A tire curing press as set forth in claim 7 wherein said lugs when aligned have radially overlapped helical surfaces in mating engagement to lock said press closed.

9. A tire curing press as set forth in claim 8 wherein the helix angle of said mating lug surfaces is less than the angle of friction thereof whereby said ring will not tend to rotate during cure.

10. A tire curing press as set forth in claim 9 wherein said ring has modulus of elasticity so that when said ring has been rotated to bring said helical surfaces into mating engagement without substantial axial preloading of said ring, the curing medium pressure in the curing tire will cause an elastic elongation of said ring not to exceed an acceptable flash limit.

11. In a tire curing press comprising a base, an annular bottom mold support having a peripheral portion and mounted on said base, a vertically movable top mold support, an axially elongated rotatable ring journalled on said base surrounding both said bottom mold support and said top mold support when the latter is down, said ring including an inturned flange at its bottom fitting beneath the peripheral portion of said bottom mold support, breech lock means at the top of said ring between said top mold support and ring adapted to hold said press closed when said top mold support is down and said ring is rotated.

12. A tire curing press as set forth in claim 11 wherein said breech lock means comprises a series of equally, circumferentially spaced lugs on the top of said ring and on said top mold support, respectively, each having helical surfaces abutting each other when the press is closed.

13. A tire curing press as set forth in claim 12 including anti-friction axial and radial thrust bearing means supporting said ring on said base for rotation around said bottom mold support.

14. A tire curing press as set forth in claim 13 wherein said ring includes insulating material covered by a sheet metal ring and thus constitutes a cylindrical heat shield for said press.

15. A tire curing press as set forth in claim 13 including a piston-cylinder assembly operative to rotate said ring from an adjustable stop wherein said breech lock is open to a position wherein said breech lock is closed.

16. A tire curing press as set forth in claim 13 wherein said ring has a modulus of elasticity so that when said ring has been rotated to bring said helical surfaces into mating engagement without substantial axial preloading of said ring, the curing medium pressure in the curing tire will cause an elastic elongation of said ring not to exceed an acceptable flash limit.

17. In a tire curing press comprising a base, a bottom mold support mounted on said base, a movable top mold support, a loading station at the front of the press, a discharge station at the rear of the press, a pair of side frames on each side of said base, each supporting parallel rails extending fore and aft of the press, a carriage mounted on said rails for movement therealong, a green tire loading chuck, elevator means supporting said chuck and said movable top mold support on said carriage for vertical movement whereby when both are elevated said carriage may be moved rearwardly a distance equal to the distance between said loading station and bottom mold support and when thus moved, placing the loading chuck over the bottom mold support and the top mold support over the discharge station an axially elongated cylindrical rotatable ring journalled on said base surrounding both said bottom mold said ring including an inturned flange at its bottom fitting beneath the peripheral portion of said bottom mold support, and breech lock means at the top of said ring between said top mold support and ring adapted to hold said press closed when said top mold support is down and said ring is rotated.

18. A tire curing press as set forth in claim 17 wherein said elevator means for said chuck and top mold support comprise respective vertically extending fluid piston-cylinder assemblies.

19. A tire curing press as set forth in claim 17 wherein said movable top mold support is supported from said carriage by a tubular member sliding in a sleeve on said carriage.

20. A tire curing press as set forth in claim 17 wherein said side frames support said base and bottom mold support at an elevated position.

21. A tire curing press as set forth in claim 17 wherein said rails extend in cantilever fashion fore and aft of said side frames.

22. A tire curing press as set forth in claim 21 including a green tire loading stand at approximately the same elevation as the tire cavity of said press.

23. A tire curing press as set forth in claim 22 wherein said stand is in the form of a cart.

24. A tire curing press as set forth in claim 17 wherein said breech lock means comprises a series of equally circumferentially spaced lungs on the top of said ring and on said top mold support, respectively, each having helical surfaces abutting each other when the press is closed.

25. A tire curing press as set forth in claim 24 including anti-friction axial and radial thrust bearing means supporting said ring on said base for rotation around said bottom mold support.

26. A tire curing press as set forth in claim 25 wherein said ring includes insulating material covered by a sheet metal ring and thus constitutes a cylindrical heat shield for said press.

27. A tire curing press as set forth in claim 25 including a piston-cylinder assembly operative to rotate said ring from an adjustable stop wherein said breech lock is open to a position wherein said breech lock is closed.

28. A tire press as set forth in claim 25 wherein said ring has a modulus of elasticity so that when said ring has been rotated to bring said helical surfaces into mating engagement without substantial axial preloading of said ring, the curing medium pressure in the curing tire will cause an elastic elongation of said ring not to exceed an acceptable flash limit.

* * * * *